(12) United States Patent
Tao et al.

(10) Patent No.: US 12,542,303 B2
(45) Date of Patent: *Feb. 3, 2026

(54) ELECTROCHEMICAL DEVICE

(71) Applicant: Ningde Amperex Technology Limited, Fujian (CN)

(72) Inventors: Qiang Tao, Fujian (CN); Chao Gao, Fujian (CN); Qiang Zheng, Fujian (CN); Zhanzhao Fang, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 90 days.

This patent is subject to a terminal disclaimer.

(21) Appl. No.: 18/316,385

(22) Filed: May 12, 2023

(65) Prior Publication Data

US 2023/0282888 A1 Sep. 7, 2023

Related U.S. Application Data

(63) Continuation of application No. 16/254,865, filed on Jan. 23, 2019, now Pat. No. 11,695,160.

(30) Foreign Application Priority Data

Nov. 5, 2018 (CN) .......................... 201811308809.5

(51) Int. Cl.
*H01M 10/05* (2010.01)
*H01M 4/04* (2006.01)
(Continued)

(52) U.S. Cl.
CPC ..... *H01M 10/0587* (2013.01); *H01M 4/0404* (2013.01); *H01M 4/131* (2013.01); *H01M 4/1391* (2013.01); *H01M 10/0525* (2013.01)

(58) Field of Classification Search
None
See application file for complete search history.

(56) References Cited

U.S. PATENT DOCUMENTS

2007/0059605 A1 3/2007 Nakamura et al.
2008/0311479 A1 12/2008 Lee et al.
(Continued)

FOREIGN PATENT DOCUMENTS

CN 101313428 A 11/2008
CN 101894937 A 11/2010
(Continued)

OTHER PUBLICATIONS

Chinese Third Office Action and Search Report mailed Jun. 16, 2021, in counterpart Chinese Application No. 201811308809.5, 10 pages in Chinese.
(Continued)

*Primary Examiner* — Barbara L Gilliam
*Assistant Examiner* — Angela J Martin
(74) *Attorney, Agent, or Firm* — Maier & Maier, PLLC (57) ABSTRACT

A cell, formed by winding or stacking a first electrode and a second electrode which are arranged at an interval, and a separator is disposed between the first electrode and the second electrode. The first electrode includes a first current collector, and the first current collector includes a coated region coated with a first active material and an uncoated region without the first active material; the uncoated region is at least partially provided with an insulating layer. The adhesion between the insulating layer and the first current collector is not less than about 0.5 N/m.

12 Claims, 3 Drawing Sheets

(51) Int. Cl.
*H01M 4/13* (2010.01)
*H01M 4/131* (2010.01)
*H01M 4/1391* (2010.01)
*H01M 10/0525* (2010.01)
*H01M 10/0587* (2010.01)

(56) References Cited

U.S. PATENT DOCUMENTS

| | | |
|---|---|---|
| 2012/0058375 A1 | 3/2012 | Tanaka et al. |
| 2013/0216892 A1 | 8/2013 | Matsuura et al. |
| 2014/0087250 A1 | 3/2014 | Coowar |
| 2014/0255778 A1 | 9/2014 | Huh et al. |
| 2016/0093859 A1 | 3/2016 | Kawaguhi et al. |

FOREIGN PATENT DOCUMENTS

| | | | | |
|---|---|---|---|---|
| CN | 102386419 A | | 3/2012 | |
| CN | 103173148 | * | 6/2013 | ................ C09J 7/02 |
| CN | 103173148 A | | 6/2013 | |
| CN | 103190028 A | | 7/2013 | |
| CN | 104466097 A | | 3/2015 | |
| CN | 105322213 A | | 2/2016 | |
| CN | 104466097 B | | 10/2017 | |
| JP | 2009037833 | * | 2/2009 | ............. H01M 4/02 |
| JP | 2009037833 A | | 2/2009 | |

OTHER PUBLICATIONS

Chinese Second Office Action mailed Nov. 26, 2020, in counterpart Chinese Application No. 201811308809.5, 8 pages.

Chinese First Office Action mailed Mar. 13, 2020 in counterpart Chinese Application No. 201811308809.5, 9 pages.

Extended European Search Report mailed Dec. 17, 2019 in corresponding European Patent Application No. EP19178263.0, 11 pages in English.

Firas Awaja et al., "Adhesion of Polymers", Progress in Polymer Science, vol. 34, No. 9, Sep. 2009, pp. 948-968.

* cited by examiner

ELECTROCHEMICAL DEVICE

CROSS-REFERENCE TO THE RELATED APPLICATIONS

The present application is a continuation application of U.S. Ser. No. 16/254,865, filed on Jan. 23, 2019, which claims the benefit of priority from China Patent Application No. 201811308809.5, filed on 5 Nov. 2018, the disclosure of which is hereby incorporated by reference in its entirety.

TECHNICAL FIELD

The present application relates to an electrochemical device, and more particularly to an electrochemical device with improved safety performance.

BACKGROUND

At present, electrochemical devices (e.g., batteries) are becoming more widely used as they have become closely related to people's daily lives. However, the technology of battery safety is not mature at present, and safety problems caused by external forces puncturing batteries, which may even result in battery explosions, may occasionally occur on the user side. Therefore, with the popularization of batteries, the users, vendors and battery manufacturers have put forward newer and more stringent requirements for the safety performance of batteries.

In view of this, it is indeed necessary to provide an improved electrochemical device with excellent safety performance, for example, a lithium ion battery.

SUMMARY

The embodiments of the present application seek to solve at least one of the problems in the related art to certain extent by providing an electrochemical device.

In one embodiment, the present application provides a cell, wherein the cell is formed by winding or stacking a first electrode and a second electrode which are arranged at an interval, and a separator is disposed between the first electrode and the second electrode. Wherein the first electrode includes a first current collector, and the first current collector includes a coated region coated with a first active material and an uncoated region without coating the first active material. The uncoated region is at least partially provided with an insulating layer; and the adhesion between the insulating layer and the first current collector is not less than about 0.5 N/m. In some embodiments, the adhesion between the insulating layer and the first current collector is not less than about 0.8 N/m. In some embodiments, the adhesion between the insulating layer and the first current collector ranges from about 0.5 N/m to about 15 N/m. In some embodiments, the adhesion between the insulating layer and the first current collector is greater than or equal to about 0.8 N/m and less than or equal to about 15 N/m. In some embodiments, the insulating layer at least covers the uncoated region without the first active material at the outer ring of the cell.

According to an embodiment of the present application, the insulating layer includes an insulating material.

According to an embodiment of the present application, the insulating layer further includes an adhesive.

According to an embodiment of the present application, the insulating layer has the porosity of about 3% to about 60%. In some embodiments, the insulating layer has the porosity of about 20% to about 60%. In some embodiments, the insulating layer has the porosity of about 25%.

According to an embodiment of the present application, the weight percentage of the insulating material to the adhesive is about 50%: 50% to about 90%: 10%. In some embodiments, the weight percentage of the insulating material to the adhesive is about 50%: 50% to about 80%: 20%.

According to an embodiment of the present application, the insulating layer is a hot melt adhesive.

According to an embodiment of the present application, the insulating material includes at least one of an inorganic oxide, a polymer material and a non-metal element.

According to an embodiment of the present application, the inorganic oxide includes at least one of aluminum oxide, silicon oxide, calcium oxide, boehmite and calcium carbonate. The polymer material includes at least one of polytetrafluoroethylene, rubber and resin. And the non-metal element is silicon.

According to an embodiment of the present application, the adhesive includes at least one of styrene butadiene rubber, nitrile rubber, carboxylated nitrile rubber, carboxylated styrene butadiene rubber, phenolic resin glue, polybutene, polypropylene, polyvinylidene fluoride, polyimide and polyvinyl acetate.

According to an embodiment of the present application, the first electrode is a positive electrode, and the second electrode is a negative electrode.

In another embodiment, the present application provides a method for preparing the cell according to the embodiments of the present application, including the following steps: coating the first current collector with the insulating layer; drying the first current collector coated with the insulating layer; and rolling the first current collector coated with the insulating layer under the pressure of about 10 T to about 25 T.

According to one embodiment of the present application, the step of coating the first current collector with the insulating layer includes the following sub-steps: rolling the first current collector; and coating the first current collector with the insulating layer.

In another embodiment, the present application provides a battery, including the cell according to the embodiments of the present application, an electrolyte and a housing, wherein the housing encloses the cell.

Additional aspects and advantages of the embodiments of the present application will be described or shown in the following description or interpreted by implementing the embodiments of the present application.

BRIEF DESCRIPTION OF THE DRAWINGS

Drawings necessary to describe the embodiments of the present application or the prior art will be briefly illustrated so as to facilitate the description of the embodiments of the present application. Obviously, the accompanying drawings described below only show some embodiments of the present application. For those skilled in the art, the drawings of other embodiments can still be obtained according to the structures illustrated in the drawings without any creative effort.

DETAILED DESCRIPTION

The embodiments of the present application will be described in detail below. In the specification of the present application, the same or similar components and the components having the same or similar functions are denoted by similar reference signs. The embodiments described herein with respect to the drawings are illustrative and graphical, and are used for providing a basic understanding of the present application. The embodiments of the present application should not be interpreted as limitations to the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other values are sometimes presented in range formats in the present application. It should be appreciated that such range formats are for convenience and conciseness, and should be flexibly understood as including not only values explicitly specified to range constraints, but also all individual values or subranges within the ranges, like explicitly specifying each value and each sub-range.

Of the tests for effectively evaluating the safety performance of an electrochemical device (such as a lithium ion battery, exemplified below as a lithium ion battery), the most rigorous test is a nail penetration test: using a pointed steel nail having a certain diameter to pierce the lithium ion battery at a certain speed, so as to cause the lithium ion battery short-circuit. The short-circuit type can be summarized as two types: the first type is an inner short circuit of electrodes of the lithium ion battery, that is, the electrodes of the lithium ion battery contacting each other and being connected to form a short circuit during the nail penetration process; and the second type is a short circuit indirectly generated by the electrodes through the nail, that is, the electrodes of the lithium ion battery being not directly connected but both in contact with the nail. Since the nail itself is made of steel and capable of conducting electricity, the electrodes are connected.

Specifically, the lithium ion battery may undergo four short-circuit types during the nail penetration process: the first type is that a first active material layer (e.g., a cathode active material layer) electrically contacts with a second active material layer (e.g., an anode active material layer), the second type is that a first active material layer (e.g., a cathode active material layer) electrically contacts with a second current collector (e.g., an anode current collector, which is usually a copper foil), the third type is that a first current collector (e.g., a cathode current collector, which is usually an aluminum foil) electrically contacts with the second current collector (e.g., an anode current collector, which is usually a copper foil), and the forth type is that first current collector (e.g., a cathode current collector, which is usually an aluminum foil) electrically contacts with the second active material layer (e.g., an anode active material layer). Hereinafter, the cathode is exemplified as a first electrode, the cathode active material layer is exemplified as a first active material layer, and the cathode current collector is exemplified as a first current collector. Hereinafter, the anode is exemplified as a second electrode, the anode active material layer is exemplified as a second active material layer, and the anode current collector is exemplified as a second current collector. In the above four short-circuit types, the short-circuit type of the cathode current collector (usually an aluminum foil) electrically contacting with the anode active material layer is the most dangerous one due to very high heat generation, ease of failure of the anode active material layer and the like during the short circuit. Therefore, avoiding the short-circuit type of the cathode current collector (usually an aluminum foil) electrically contacting with the anode active material layer during the nail penetration process is the most effective means to improve the nail penetration safety of the lithium ion battery.

In prior art, the direct contact of the anode active material layer and the cathode current collector is usually avoided by providing a coating with a large resistivity on the surface of the anode active material layer or a coating (e.g., an insulating layer) with a large resistivity on the surface of the cathode current collector, thereby avoiding the most dangerous short-circuit type of the cathode current collector (usually an aluminum foil) electrically contacting with the anode active material layer.

However, in prior art, when the coating (e.g., an insulating layer) with a large resistivity is provided on the surface of the cathode current collector, the adhesion between the coating and the cathode current collector is remarkably reduced when being immersed in an electrolytic solution, causing the coating to be easily peeled off from the cathode current collector when the lithium ion battery is pierced by an external force, so that the coating cannot play a protecting role. Therefore, the coating (e.g., an insulating layer) and the cathode current collector must maintain a higher adhesion after being immersed in the electrolytic solution to achieve the protecting effect of the coating.

Figure 1:
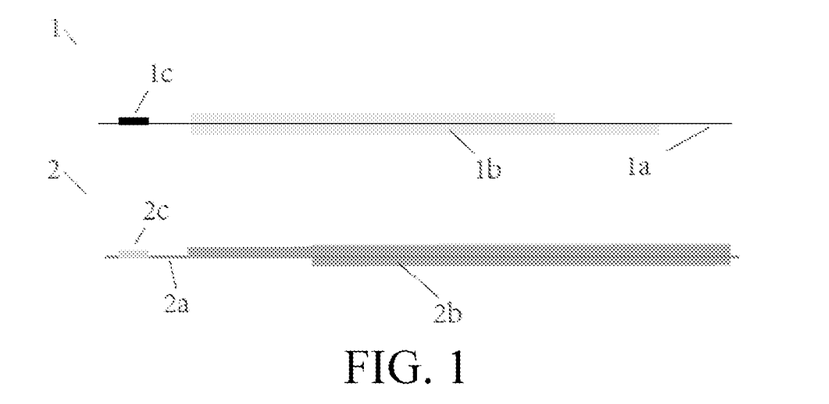
FIG. 1 is a schematic view of an anode (negative electrode) 2 and a cathode (positive electrode) 1 that is not coated with an insulating layer, wherein the cathode 1 that is not coated with the insulating layer includes an Al foil 1a, lithium cobalt oxide 1b coated on the Al foil 1a, and an Al tab 1c, and the anode 2 includes a Cu foil 2a, graphite 2b coated on the Cu foil 2a, and a Ni tab 2c.
Figure 2:
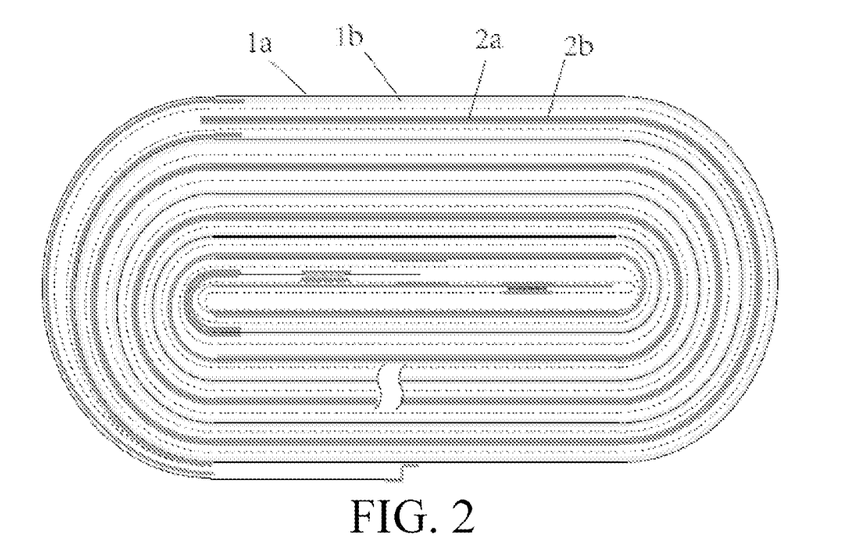
FIG. 2 is a schematic view of a cell structure after winding the anode 2 and the cathode 1 shown in FIG. 1.
Figure 3:
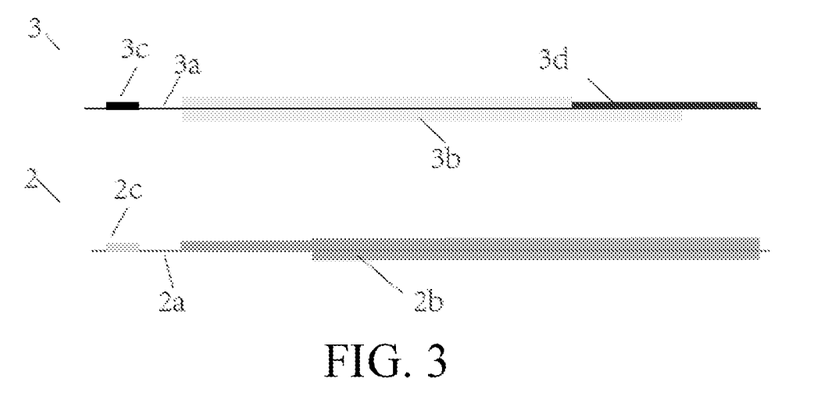
FIG. 3 is a schematic view of the anode 2 and a cathode 3 that is coated with an insulating layer, wherein the cathode 3 that is coated with the insulating layer includes an Al foil 3a, lithium cobalt oxide 3b coated on the Al foil 3a, an Al tab 3c, and a protective layer/insulating layer 3d.

In the present application, an uncoated region of the cathode current collector of the cathode, which is uncoated with an active material, is coated with a specific insulating layer (as shown in FIG. 3) to effectively improve the adhesion between the insulating layer and the current collector. Further, the porosity of the insulating layer is controlled to prevent the lithium ion battery from the short-circuit type of the cathode current collector electrically contacting with the anode active material layer when subjected to external force impact, nail penetration or extrusion. Thereby ensuring the mechanical safety performance of the lithium ion battery.

The adhesion between the insulating layer and the cathode current collector, and the porosity of the insulating layer can be achieved by selecting the type of the insulating material, the type of the adhesive, and controlling the weight percentage of the insulating material to the adhesive, or the application of pressure. In some embodiments, after the insulating layer is coated to the cathode current collector, the coated cathode current collector is rolled under the pressure of about 10 to about 25 T.

In some embodiments of the present application, in the case where the adhesion between the insulating layer and the cathode current collector is identical, the smaller the porosity of the insulating layer is, the better the safety performance of the lithium ion battery is. In some embodiments of the present application, in the case where the porosity of the insulating layer is identical, the higher the adhesion between the insulating layer and the cathode current collector is, the better the safety performance of the lithium ion battery is.

Figure 4:
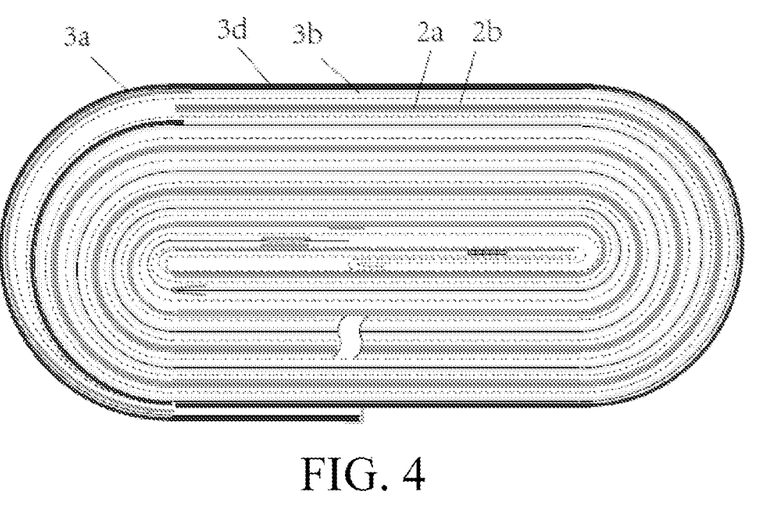
FIG. 4 is a schematic view of a cell structure after winding the anode 2 and the cathode 3 shown in FIG. 3.

As shown in FIG. 4, the insulating layer 3d of the present application can at least cover a region, which is not covered by the active material layer, of the cathode current collector. In some embodiments, the insulating layer 3d at least covers the uncoated region at the outer ring of the cell structure.

According to an embodiment of the present application, the adhesion between the insulating layer and the cathode current collector is not less than about 0.5 N/m. In some embodiments, the adhesion between the insulating layer and the cathode current collector is not less than about 0.8 N/m. In some embodiments, the adhesion between the insulating layer and the cathode current collector ranges from about 0.5 N/m to about 10 N/m.

According to an embodiment of the present application, the insulating layer has the porosity of about 3% to about 60%. In some embodiments, the insulating layer has the porosity of about 20% to about 60%. In some embodiments, the insulating layer has the porosity of about 25%, about 30%, about 35%, about 40%, about 45%, about 50%, or about 55%.

According to an embodiment of the present application, the insulating layer includes an insulating material. In some embodiments, the insulating layer further includes an adhesive.

According to an embodiment of the present application, the insulating material includes, but is not limited to, an inorganic oxide or ceramic material, a polymer material and a non-metal element. In some embodiments, the inorganic oxide or ceramic material includes, but is not limited to, aluminum oxide, silicon oxide, calcium oxide, boehmite and calcium carbonate. In some embodiments, the polymer material includes, but is not limited to, polytetrafluoroethylene, rubber and resin. In some embodiments, the non-metal element includes, but is not limited to, silicon. In some embodiments, the insulating layer includes, but is not limited to, a hot melt adhesive.

According to an embodiment of the present application, the adhesive includes, but is not limited to, styrene butadiene rubber, nitrile rubber, carboxylated nitrile rubber, carboxylated styrene butadiene rubber, phenolic resin glue, polybutene, polypropylene, polyvinylidene fluoride, polyimide and polyvinyl acetate.

According to an embodiment of the present application, the weight percentage of the insulating material to the adhesive is about 50%: 50% to about 90%: 10%. In some embodiments, the weight percentage of the insulating material to the adhesive is about 50%: 50% to about 80%: 20%. In some embodiments, the weight percentage of the insulating material to the adhesive is about 50%: 50% to about 70%: 30%. In some embodiments, the weight percentage of the insulating material to the adhesive is about 50%: 50% to about 60%: 40%.

According to an embodiment of the present application, the battery includes, but is not limited to, a lithium ion battery.

In the above lithium ion battery, the cathode current collector can be an aluminum foil or a nickel foil, and the anode current collector can be a copper foil or a nickel foil.

In the above lithium ion battery, the cathode active material layer includes a cathode material capable of absorbing and releasing lithium (Li) (hereinafter, sometimes referred to as "a cathode material capable of absorbing/releasing lithium (Li)"). Examples of the cathode material capable of absorbing/releasing lithium (Li) can include at least one of lithium cobalt oxide, lithium nickel manganese cobalt oxide, aluminum-doped lithium nickel cobalt oxide, lithium manganate, lithium manganese iron phosphate, lithium vanadium phosphate, lithium vanadium phosphate, lithium iron phosphate, lithium titanate or lithium-rich manganese-based materials.

In the above cathode material, the chemical formula of the lithium cobalt oxide can be $Li_xCo_aM1_bO_{2-c}$, wherein M1 denotes at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), stannum (Sn), calcium (Ca), strontium (Sr), tungsten (W), yttrium (Y), lanthanum (La), zirconium (Zr) or silicon (Si), and the values of x, a, b, and c are respectively in the following ranges: $0.8 \leq x \leq 1.2$, $0.8 \leq a \leq 1$, $0 \leq b \leq 0.2$, and $-0.1 \leq c \leq 0.2$.

In the above cathode material, the chemical formula of the lithium nickel manganese cobalt oxide or aluminum-doped lithium nickel cobalt oxide can be $Li_yNi_dM2_eO_{2-f}$, wherein M2 denotes at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), stannum (Sn), calcium (Ca), strontium (Sr), tungsten (W), zirconium (Zr) or silicon (Si), and the values of y, d, e, and f are respectively in the following ranges: $0.8 \leq y \leq 1.2$, $0.3 \leq d \leq 0.98$, $0.02 \leq e \leq 0.7$, and $-0.1 \leq f \leq 0.2$.

In the above cathode material, the chemical formula of the lithium manganate is $Li_zMn_{2-g}M3_gO_{4-h}$, wherein M3 denotes at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), stannum (Sn), calcium (Ca), strontium (Sr) or tungsten (W), and the values of z, g and h are respectively in the following ranges: $0.8 \leq z \leq 1.2$, $0 \leq g < 1.0$, $-0.2 \leq h \leq 0.2$.

The anode active material layer includes an anode material capable of absorbing and releasing lithium (Li) (hereinafter, sometimes referred to as "an anode material capable of absorbing/releasing lithium (Li)"). Examples of the anode material capable of absorbing/releasing lithium (Li) can include a carbon material, a metal compound, an oxide, a sulfide, or a nitride of lithium including $LiN_3$, a lithium metal, a metal forming an alloy with lithium, and a polymer material.

The carbon material can includes low graphitized carbon, easily graphitized carbon, artificial graphite, natural graphite, mesocarbon microbeads, soft carbon, hard carbon, pyrolytic carbon, coke, vitreous carbon, an organic polymer compound sintered body, carbon fibers and active carbon. The coke can include pitch coke, needle coke and petroleum coke. The organic polymer compound sintered body refers to a material obtained by calcining a polymer material such as phenol plastic or furan resin at an appropriate temperature to carbonize the polymer material, and some of these materials are classified into low graphitized carbon or easily graphitized carbon. The polymer material can include polyacetylene and polypyrrole.

Among these anode materials capable of absorbing/releasing lithium (Li), materials of which the charging and discharging voltages are close to the charging and discharging voltages of the lithium metal are selected. This is because if the charging and discharging voltages of the anode material are lower, the lithium ion battery can more easily have higher energy density. The anode material can be selected from carbon materials because their crystal structures are only slightly changed upon charging and discharging, so good cycle characteristics and large charging and discharging capacities can be obtained. For example, graphite is selected because it can give a large electrochemical equivalent and a high energy density.

Further, the anode material capable of absorbing/releasing lithium (Li) can include elemental lithium metals, metal elements and semi-metal elements capable of forming alloys together with lithium (Li), alloys and compounds thereof, etc. They can be used together with a carbon material to obtain good cycle characteristics as well as high energy density. In addition to the alloys including two or more metal elements, the alloys used here also include alloys including one or more metal elements and one or more semi-metal elements. The alloys can be in the form of a solid solution, a eutectic crystal, an intermetallic compound, and a mixture thereof.

The metal elements and the semi-metal elements can include stannum (Sn), plumbum (Pb), aluminum (Al), indium (In), silicon (Si), zinc (Zn), stibium (Sb), bismuth (Bi), cadmium (Cd), magnesium (Mg), boron (B), gallium (Ga), germanium (Ge), arsenic (As), silver (Ag), zirconium (Zr), yttrium (Y) or hafnium (Hf). The alloys and compounds mentioned above may include materials having a chemical formula of $Ma_sMb_tLi_u$ and materials having a chemical formula of $Ma_pMc_qMd_r$. In these chemical formulas, Ma denotes at least one of the metal elements and the semi-metal elements capable of forming an alloy together with lithium; Mb denotes at least one of the metal elements and the semi-metal elements except lithium and Ma; Mc denotes at least one of the non-metal elements; Md denotes at least one of the metal elements and the semi-metal elements except Ma; wherein $s>0$, $t≥0$, $u>0$, $p>0$, $q>0$, and $r≥0$.

Further, an inorganic compound not including lithium (Li), such as $MnO_2$, $V_2O_5$, $V_6O_{13}$, NiS or MOS, can be used in the anode pole.

The above lithium ion battery further includes an electrolyte, the electrolyte can be one or more of a gel electrolyte, a solid electrolyte and an electrolytic solution, and the electrolytic solution includes a lithium salt and a non-aqueous solvent.

The lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB or lithium difluoroborate. In one embodiment of the present application, $LiPF_6$ is selected as the lithium salt due to its high ionic conductivity and improve cycle characteristics.

The non-aqueous solvent can be a carbonate compound, a carboxylate compound, an ether compound, other organic solvent or a combination thereof.

The carbonate compound can be a chain carbonate compound, a cyclic carbonate compound, a fluorocarbonate compound or a combination thereof.

The chain carbonate compound may be diethyl carbonate (DEC), dimethyl carbonate (DMC), dipropyl carbonate (DPC), methyl propyl carbonate (MPC), ethyl propyl carbonate (EPC), methyl ethyl carbonate (MEC), and a combination thereof. The cyclic carbonate compound may be ethylene carbonate (EC), propylene carbonate (PC), butylene carbonate (BC), vinyl ethylene carbonate (VEC) or a combination thereof. The fluorocarbonate compound may be fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate or a combination thereof.

The carboxylate compound may be methyl acetate, ethyl acetate, n-propyl acetate, tert-butyl acetate, methyl propionate, ethyl propionate, propyl propionate, γ-butyrolactone, decalactone, valerolactone, mevalonolactone, caprolactone, methyl formate or a combination thereof.

The ether compound may be dibutyl ether, tetraethylene glycol dimethyl ether, diglyme, 1,2-dimethoxyethane, 1,2-diethoxyethane, ethoxymethoxyethane, 2-methyltetrahydrofuran, tetrahydrofuran or a combination thereof.

The other organic solvent may be dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate or a combination thereof.

Although the above is exemplified by the lithium ion battery, those skilled in the art could understand after reading the present application that the components of the electrochemical device disclosed in the present application can be used for other suitable electrochemical devices. Such electrochemical devices may include any device for electrochemical reaction including but not limit to all kinds of primary batteries, secondary batteries, fuel cells, solar cells or capacitors. In different embodiments of the present application, the electrochemical devices can be batteries including lead acid batteries, nickel-cadmium batteries, nickel-hydrogen batteries, lithium ion batteries, etc. In particular, the electrochemical devices can be lithium secondary batteries including lithium metal batteries, lithium ion batteries, lithium polymer batteries or lithium ion polymer batteries.

Hereinafter, the lithium ion battery is exemplified as an example and the preparation of the lithium ion battery is described in conjunction with a specific embodiment. Those skilled in the art would understand that the preparation method described in the present application is merely an example, and any other suitable preparation methods fall within the scope of the present application.

EMBODIMENTS

Embodiments of the lithium ion battery according to the present application and comparative examples for performance evaluation are described below.

Comparative Example 1

The region uncoated by the lithium cobalt oxide of the cathode current collector is exposed (not coated with the insulating layer). The cathode is not rolled.

Comparative Example 2

The region uncoated by the lithium cobalt oxide at the end of the cathode current collector is coated with the insulating layer. The insulating layer contains boehmite, polyvinylidene fluoride and NMP. The weight ratio of the boehmite to the polyvinylidene fluoride is 80%: 20%. The cathode is not rolled.

Comparative Example 3

The region uncoated by the lithium cobalt oxide at the end of the cathode current collector is coated with an insulating layer. The insulating layer contains boehmite, polyvinylidene fluoride and NMP. The weight ratio of the boehmite to the polyvinylidene fluoride is 95%: 5%. The coated cathode is rolled under the pressure of 15 T.

Comparative Example 4

The region uncoated by the lithium cobalt oxide at the end of the cathode current collector is coated with an insulating layer. The insulating layer contains boehmite, polyvinylidene fluoride and NMP. The weight ratio of the boehmite to the polyvinylidene fluoride is 98%: 2%. The coated cathode is rolled under the pressure of 25 T.

Comparative Example 5

The region uncoated by the lithium cobalt oxide at the end of the cathode current collector is coated with an insulating layer. The insulating layer contains $BaSO_4$, styrene butadiene rubber and water. The weight ratio of the $BaSO_4$ to the styrene butadiene rubber is 55%: 45%. The coated cathode is rolled under the pressure of 25 T.

Comparative Example 6

The region uncoated by the lithium cobalt oxide at the end of the cathode current collector is coated with an insulating layer. The insulating layer is green rubber. The cathode is not rolled.

Embodiment 1

The region uncoated by the lithium cobalt oxide at the end of the cathode current collector is coated with an insulating layer. The insulating layer contains boehmite, polyvinylidene fluoride and NMP. The weight ratio of the boehmite to the polyvinylidene fluoride is 90%: 10%. The coated cathode is rolled under the pressure of 25 T.

Embodiment 2

The region uncoated by the lithium cobalt oxide at the end of the cathode current collector is coated with an insulating layer. The insulating layer contains boehmite, polyvinylidene fluoride and NMP. The weight ratio of the boehmite to the polyvinylidene fluoride is 80%: 20%. The coated cathode is rolled under the pressure of 10 T.

Embodiment 3

The region uncoated by the lithium cobalt oxide at the end of the cathode current collector is coated with an insulating layer. The insulating layer contains boehmite, polyvinylidene fluoride and NMP. The weight ratio of the boehmite to the polyvinylidene fluoride is 80%: 20%. The coated cathode is rolled under the pressure of 25 T.

Embodiment 4

The region uncoated by the lithium cobalt oxide at the end of the cathode current collector is coated with an insulating layer. The insulating layer contains boehmite, polyvinylidene fluoride and NMP. The weight ratio of the boehmite to the polyvinylidene fluoride is 60%: 40%. The coated cathode is rolled under the pressure of 15 T.

Embodiment 5

The region uncoated by the lithium cobalt oxide at the end of the cathode current collector is coated with an insulating layer. The insulating layer contains boehmite, polyvinylidene fluoride and water. The weight ratio of the boehmite to the polyvinylidene fluoride is 50%: 50%. The coated cathode is rolled under the pressure of 10 T.

Embodiment 6

The region uncoated by the lithium cobalt oxide at the end of the cathode current collector is coated with an insulating layer. The insulating layer contains boehmite, styrene butadiene rubber and water. The weight ratio of the boehmite to the styrene butadiene rubber is 50%: 50%. The coated cathode is rolled under the pressure of 15 T.

Embodiment 7

The region uncoated by the lithium cobalt oxide at the end of the cathode current collector is coated with an insulating layer. The insulating layer contains aluminum oxide, polyvinylidene fluoride and NMP. The weight ratio of the aluminum oxide to the polyvinylidene fluoride is 75%: 25%. The coated cathode is rolled under the pressure of 15 T.

Embodiment 8

The region uncoated by the lithium cobalt oxide at the end of the cathode current collector is coated with an insulating layer. The insulating layer contains calcium oxide, styrene butadiene rubber and water. The weight ratio of the calcium oxide to the styrene butadiene rubber is 80%: 20%. The coated cathode is rolled under the pressure of 15 T.

Embodiment 9

The region uncoated by the lithium cobalt oxide at the end of the cathode current collector is coated with an insulating layer. The insulating layer is a hot melt adhesive.

Embodiment 10

The region uncoated by the lithium cobalt oxide at the end of the cathode current collector is coated with an insulating layer. The insulating layer contains silicon, polyvinylidene fluoride and NMP. The weight ratio of the silicon to the polyvinylidene fluoride is 80%: 20%. The coated cathode is rolled under the pressure of 15 T.

The preparation methods and test methods for the conventional lithium ion batteries (Comparative Examples 1-6) and lithium ion batteries according to the embodiments of the present application (Embodiments 1-10) are as follows. And, a comparison thereof are shown in Table 1.

1. Preparation of a Lithium Ion Battery
(1) Preparation of a Cathode

Dissolving a cathode active material lithium cobalt oxide (LiCoO$_2$), an adhesive and a conductive agent conductive carbon black (Super P) at a mass ratio of 94:3:3 into a dispersant N-methylpyrrolidone (NMP), and stirring uniformly to form a cathode paste. Then, uniformly coating the cathode paste on the front and back surfaces of a cathode current collector aluminum foil using a coater, and drying at 85° C. to obtain a cathode active material layer. Mixing an insulating material and an adhesive at a certain ratio in a solvent. Coating a region, which is uncoated by the lithium cobalt oxide, of the cathode current collector with the mixture obtained, and drying the obtained cathode current collector. Rolling the cathode under a certain pressure. Cold pressing, slitting and cutting, and welding a cathode tab Ni which is 10 mm from the end of the cathode to obtain the cathode.

(2) Preparation of an Anode Electrode

Mixing an anode active material artificial graphite, an adhesive styrene-butadiene rubber and a conductive agent conductive carbon black (Super P) at a mass ratio of 92:3:5 with deionized water uniformly to form an anode paste. Then, uniformly coating the anode paste on the front and back surfaces of an anode current collector copper foil using the coater, and drying at 85° C. to form an anode active material layer. Rolling the anode at a certain pressure. Cold pressing, slitting and cutting, and welding an anode tab Al which is 12 mm from the end of the anode to obtain the anode.

(3) Preparation of an Electrolytic Solution

In a dry argon atmosphere, dissolving LiPF$_6$ into a non-aqueous solvent formed by mixing 30 wt % of ethylene carbonate (EC), 40 wt % of ethyl methyl carbonate (EMC) and 30 wt % of diethyl carbonate (DEC) to achieve a concentration of 1.2 M, and adding 1 wt % of vinylene carbonate and 5 wt % of fluoroethylene carbonate to obtain the electrolytic solution.

(4) Preparation of a Lithium Ion Battery

Winding the cathode and the anode to obtain a cell structure. Positioning the cell structure in an aluminum plastic film package. Injecting the liquid electrolyte, sealing and then performing formation and air extraction to obtain the lithium ion battery.

Figure 5:
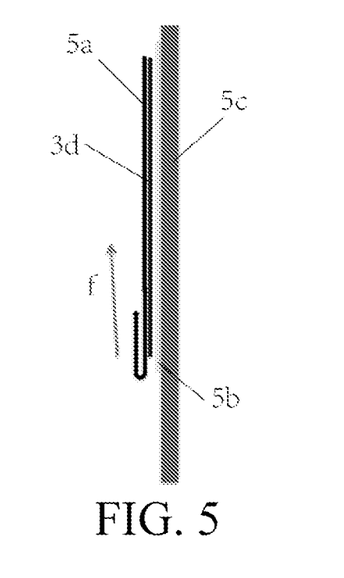
FIG. 5 shows a method for testing the adhesion between the insulating layer 3d and a cathode current collector 5a, wherein the current collector 5a coated with the insulating layer 3d is fixed to a steel plate 5c with a double-sided adhesive tape 5b, wherein one side of the insulating layer is bonded to the double-sided adhesive tape. The direction indicated by arrow f is a pulling direction.

2. Test Method (1) Test Method for Adhesion Between the Insulating Layer and the Cathode Current Collector As illustrated in FIG. 5, the method includes the steps of: fixing the current collector 5$a$ coated with the insulating layer 3$d$ to a steel plate 5$c$ with a double-sided adhesive tape 5$b$, wherein one side of the insulating layer 3$d$ is bonded to the double-sided adhesive tape 5$b$, pulling the bottom of the current collector in a 180-degree direction by a high iron tensile machine to complete the test, and recording the data. The obtained data is recorded as the adhesion between the insulating layer 3$d$ and the cathode current collector 5$a$.

(2) Test Method for the Porosity of the Insulating Layer

The apparent density of the insulating layer is calculated by weighing, and the porosity of the insulating layer is calculated by the following formula:

Porosity=apparent density/true density (3) Nail Penetration Test of the Lithium Ion Battery Positioning the lithium ion battery in a 25° C. incubator, and standing for 30 minutes so that the lithium ion battery reaches a constant temperature. Charging the lithium ion battery reaching the constant temperature at a constant current of 0.5 C until the voltage reaches a cut-off voltage. Then, charging the battery with a constant voltage of the cut-off voltage until the current reaches 0.025 C. Transferring the fully charged lithium ion battery to a nail penetration tester. The test environment temperature is kept at 25° C.±2° C. Using a steel nail having the diameter of 4 mm to pass through the center of the lithium ion battery at a constant speed of 30 mm/s, then retaining for 300 s. If the lithium ion battery does not catch fire or explode, passing is recorded. 10 lithium ion batteries are tested each time. The number of lithium ion batteries passing the nail penetration test is used as an indicator to evaluate the safety performance of the lithium ion batteries.

TABLE 1

Variable settings and test results of Comparative Examples and Embodiments of the present application

| Embodiments/ Comparative Examples | Insulating layer | Insulating material | Adhesive | Weight ratio of insulating material to adhesive | Solvent | Rolling pressure | Porosity of insulating layer | Adhesion between insulating layer and cathode current collector (N/cm) | Nail penetration test pass rate |
|---|---|---|---|---|---|---|---|---|---|
| Comparative Example 1 | No | / | / | / | / | / | / | / | 0% |
| Comparative Example 2 | Yes | Boehmite | Polyvinylidene fluoride | 80%:20% | NMP | | 62.0% | 0.1 | 40% |
| Comparative Example 3 | Yes | Boehmite | Polyvinylidene fluoride | 95%:5% | NMP | 15T | 20.0% | 0.1 | 55% |
| Comparative Example 4 | Yes | Boehmite | Polyvinylidene fluoride | 98%:2% | NMP | 25T | 10.0% | 0.2 | 65% |
| Comparative Example 5 | Yes | BaSO4 | Styrene butadiene rubber | 55%:45% | Water | 25T | 70% | 0.4 | 45% |
| Comparative Example 6 | Yes | Green rubber | / | / | / | / | 0% | 0.02 | 10% |
| Embodiment 1 | Yes | Boehmite | Polyvinylidene fluoride | 90%:10% | NMP | 25T | 12.0% | 0.8 | 100% |
| Embodiment 2 | Yes | Boehmite | Polyvinylidene fluoride | 80%:20% | NMP | 10T | 24.0% | 0.5 | 90% |

TABLE 1-continued

Variable settings and test results of Comparative Examples and Embodiments of the present application

| Embodiments/Comparative Examples | Insulating layer | Insulating material | Adhesive | Weight ratio of insulating material to adhesive | Solvent | Rolling pressure | Porosity of insulating layer | Adhesion between insulating layer and cathode current collector (N/cm) | Nail penetration test pass rate |
|---|---|---|---|---|---|---|---|---|---|
| Embodiment 3 | Yes | Boehmite | Polyvinylidene fluoride | 80%:20% | NMP | 25T | 3.0% | 0.8 | 100% |
| Embodiment 4 | Yes | Boehmite | Polyvinylidene fluoride | 60%:40% | NMP | 15T | 20.0% | 1.2 | 100% |
| Embodiment 5 | Yes | Boehmite | Polyvinylidene fluoride | 50%:50% | NMP | 10T | 60.0% | 0.6 | 80% |
| Embodiment 6 | Yes | Boehmite | Styrene butadiene rubber | 50%:50% | Water | 15T | 25% | 1.5 | 100% |
| Embodiment 7 | Yes | Aluminum oxide | Polyvinylidene fluoride | 75%:25% | NMP | 15T | 30.0% | 0.6 | 100% |
| Embodiment 8 | Yes | Calcium oxide | Styrene butadiene rubber | 80%:20% | Water | 15T | 23% | 0.9 | 100% |
| Embodiment 9 | Yes | Hot melt adhesive | / | / | / | / | 0% | 10 | 100% |
| Embodiment 10 | Yes | Silicon | Polyvinylidene fluoride | 80%:20% | NMP | 15T | 30% | 3 | 90% |

It can be seen from the above results that using an insulating layer to protect the region, which is uncoated by the active material, of the cathode current collector can improve the safety performance of the lithium ion battery.

As shown in Comparative Examples 1-6, the cathode in the conventional lithium ion batteries, which are not protected by an insulating layer, or have a low adhesion between the insulating layer and the cathode current collector, is likely to peel after immersed in an electrolytic solution. Therefore results in a low nail penetration test pass rate and poor safety characteristic of lithium ion batteries. As shown in Examples 1-10, when the adhesion between the insulating layer and the cathode current collector is not less than about 0.5 N/m, the nail penetration test pass rate is remarkably improved, and the lithium ion battery has excellent safety performance.

The same insulating layer is used in the lithium ion batteries of Comparative Example 2 and Embodiments 2 and 3. The porosity of the insulating layer and the adhesion between the insulating layer and the cathode current collector change under different rolling conditions. The results show that the larger the adhesion between the insulating layer and the cathode current collector is and the lower the porosity of the insulating layer is, the better the protection of the insulating layer to the current collector is, and the higher the nail penetration test pass rate is.

According to Comparative Example 3 and Embodiment 4, in the case where the porosity of the insulating layer is identical, the higher the adhesion between the insulating layer and the cathode current collector is, the higher the nail penetration test pass rate is, and the better the safety performance of the lithium ion battery is.

According to Embodiment 5 and Embodiment 7, in the case where the adhesion between the insulating layer and the cathode current collector is identical, if the porosity of the insulating layer is smaller, the nail penetration test pass rate can be improved to a certain extent, so that the safety performance of the lithium ion battery is improved.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. A cell, comprising: a first electrode, a second electrode, and a separator disposed between the first electrode and the second electrode; wherein, the cell is formed by winding the first electrode and the second electrode into a wound structure, an outermost part of the first electrode extends beyond a winding terminating end of the second electrode along a winding direction of the first electrode and the second electrode, such that the outermost part of the first electrode is disposed radially outward of the winding terminating end of the second electrode in the wound structure, the winding terminating end of the second electrode being an outermost end of the second electrode;

the first electrode comprises a first current collector, the first current collector comprises a coated region coated with a first active material and an uncoated region without coating the first active material;

the uncoated region is at least partially provided with an insulating layer, the insulating layer comprises an insulating material; and an adhesion between the insulating layer and the first current collector is in a range of 0.5 N/m to 10 N/m;

wherein the insulating material comprises at least one selected from the group consisting of an inorganic oxide, a polymer material, and silicon;

the inorganic oxide comprises at least one selected from the group consisting of aluminum oxide, silicon oxide, calcium oxide, boehmite, and calcium carbonate;

the polymer material comprises at least one selected from the group consisting of polytetrafluoroethylene, rubber, and resin;

wherein the insulating layer has a porosity of about 12% to about 20%.

2. The cell according to claim 1, wherein the insulating layer further comprises an adhesive.

3. The cell according to claim 2, wherein the weight percentage of the insulating material to the adhesive is about 50%: 50% to about 90%: 10%.

4. The cell according to claim 1, wherein the insulating layer is a hot melt adhesive.

5. The cell according to claim 1, wherein the adhesion between the insulating layer and the first current collector is greater than or equal to 0.8 N/m and less than or equal to 10 N/m.

6. A method for preparing the cell according to claim 1, the method comprising the following steps:

coating the first current collector with the insulating layer;

drying the first current collector coated with the insulating layer; and rolling the first current collector coated with the insulating layer under the pressure of about 10 T to about 25 T.

7. The method according to claim 6, wherein the step of coating the first current collector with the insulating layer comprises the following sub-steps:

rolling the first current collector; and coating the first current collector with the insulating layer.

8. A battery, comprising: a cell, an electrolyte, and a housing, wherein the housing encloses the cell;

wherein, the cell is formed by winding or stacking a first electrode and a second electrode into a wound structure, a separator is disposed between the first electrode and the second electrode, and an outermost part of the first electrode extends beyond a winding terminating end of the second electrode along a winding direction of the first electrode and the second electrode, such that the outermost part of the first electrode is disposed radially outward of the winding terminating end of the second electrode within the wound structure, the winding terminating end of the second electrode being an outermost end of the second electrode; wherein the first electrode comprises a first current collector, the first current collector comprises a coated region coated with a first active material and an uncoated region without coating the first active material;

the uncoated region is at least partially provided with an insulating layer, the insulating layer comprises an insulating material; and an adhesion between the insulating layer and the first current collector is in a range of 0.5 N/m to 10 N/m;

wherein the insulating material comprises at least one selected from the group consisting of an inorganic oxide, a polymer material, and silicon;

the inorganic oxide comprises at least one selected from the group consisting of aluminum oxide, silicon oxide, calcium oxide, boehmite, and calcium carbonate;

the polymer material comprises at least one selected from the group consisting of polytetrafluoroethylene, rubber, and resin;

wherein the insulating layer has a porosity of about 12% to about 20%.

9. The battery according to claim 8, wherein the insulating layer further comprises an adhesive.

10. The battery according to claim 8, wherein the weight percentage of the insulating material to the adhesive is about 50%: 50% to about 90%: 10%.

11. The battery according to claim 8, wherein the insulating layer is a hot melt adhesive.

12. The battery according to claim 8, wherein the adhesion between the insulating layer and the first current collector is greater than or equal to 0.8 N/m and less than or equal to 10 N/m.

* * * * *